(12) United States Patent
Mathad et al.

(10) Patent No.: US 12,056,024 B1
(45) Date of Patent: Aug. 6, 2024

(54) MANAGING THE PLACEMENT OF VIRTUAL RESOURCES BETWEEN PARTITIONS OF RESOURCES IN AVAILABILITY ZONES

(71) Applicant: Amazon Technologies, Inc., Seattle, WA (US)

(72) Inventors: Disha Mathad, Seattle, WA (US); Matthys Strydom, Kirkland, WA (US); Neilen Marais, Cape Town (ZA)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 190 days.

(21) Appl. No.: 17/710,406

(22) Filed: Mar. 31, 2022

(51) Int. Cl.
*G06F 9/455* (2018.01)
*G06F 9/50* (2006.01)
*G06F 11/07* (2006.01)
*G06F 11/14* (2006.01)

(52) U.S. Cl.
CPC ...... *G06F 11/1484* (2013.01); *G06F 9/45558* (2013.01); *G06F 9/505* (2013.01); *G06F 9/5072* (2013.01); *G06F 9/5077* (2013.01); *G06F 11/0712* (2013.01); *G06F 2009/4557* (2013.01)

(58) Field of Classification Search
CPC ............. G06F 11/0712; G06F 11/1484; G06F 9/45558; G06F 9/505; G06F 9/5072; G06F 9/5077; G06F 2009/4557
See application file for complete search history.

(56) References Cited

U.S. PATENT DOCUMENTS

| 8,627,152 | B1* | 1/2014 | Deb ..................... G06F 11/0712 |
| | | | 714/49 |
| 10,620,866 | B1* | 4/2020 | Kumar ................... G06F 16/288 |
| 11,500,663 | B1* | 11/2022 | Gupta ........................ G06F 8/63 |
| 2013/0117359 | A1* | 5/2013 | Husain .................... H04L 67/34 |
| | | | 709/203 |
| 2015/0128053 | A1* | 5/2015 | Bragstad ................. H04L 41/22 |
| | | | 715/736 |

(Continued)

OTHER PUBLICATIONS

"A Comprehensive Feature Comparison Study of Open-Source Container Orchestration Frameworks" by Truyen, Landuyt, Preuveneers, Lagaisse and Joosen published Jul. 2019 https://dialog.proquest.com/professional/cv_2188612/docview/2250570763/fulltextPDF?accountid=131444 (Year: 2019).*

*Primary Examiner* — Joseph O Schell
(74) *Attorney, Agent, or Firm* — Lee & Hayes P.C.

(57) ABSTRACT

Techniques for a service provider network to divide computing resources of availability zones into smaller, isolated partitions (or "cells"), and manage the placement of virtual computing resources into the cells to reduce overconsumption of computing resources in the cells while ensuring ensure resiliency and availability. As virtual computing resources are launched into cells, or migrated between cells, the service provider network may load balance the virtual computing resources on a per-user basis to ensure resiliency and availability across the cells. Further, the service provider network may monitor the number of mutations (e.g., an operation that affects the state of a virtual computing resource) in each cell, as well as utilization rates of the underlying computing resources, and load balance virtual computing resource to maintain stable mutation rates and reduce over utilization (and/or under-utilization) of computing resources.

20 Claims, 11 Drawing Sheets

(56) References Cited

U.S. PATENT DOCUMENTS

| | | | |
|---|---|---|---|
| 2015/0370657 A1* | 12/2015 | Marakala | G06F 11/1484 714/15 |
| 2016/0132347 A1* | 5/2016 | Brandwine | G06F 9/5088 718/1 |
| 2018/0203736 A1* | 7/2018 | Vyas | G06F 9/45558 |
| 2021/0389894 A1* | 12/2021 | Zhou | G06F 3/067 |
| 2022/0103554 A1* | 3/2022 | Seetharaman | G06F 16/254 |

* cited by examiner

US 12,056,024 B1

MANAGING THE PLACEMENT OF VIRTUAL RESOURCES BETWEEN PARTITIONS OF RESOURCES IN AVAILABILITY ZONES

BACKGROUND

Service providers offer cloud-based services to fulfill users' computing-service needs without the users having to invest in and maintain computing infrastructure required to implement the services. These service providers maintain networks of managed computing resources and functionality to implement various types of scalable, on-demand resources, such as compute power, memory, storage, databases, networking resources, and so forth. The networks of computing resources, or "service provider networks," can include computing systems that are located across multiple, distinct regions and interconnected by a communication network, or a series of communication networks, to exchange data. Specifically, data centers or data processing centers, may include a number of interconnected computing devices (or "servers") to provide computing resources to users of the service provider networks.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
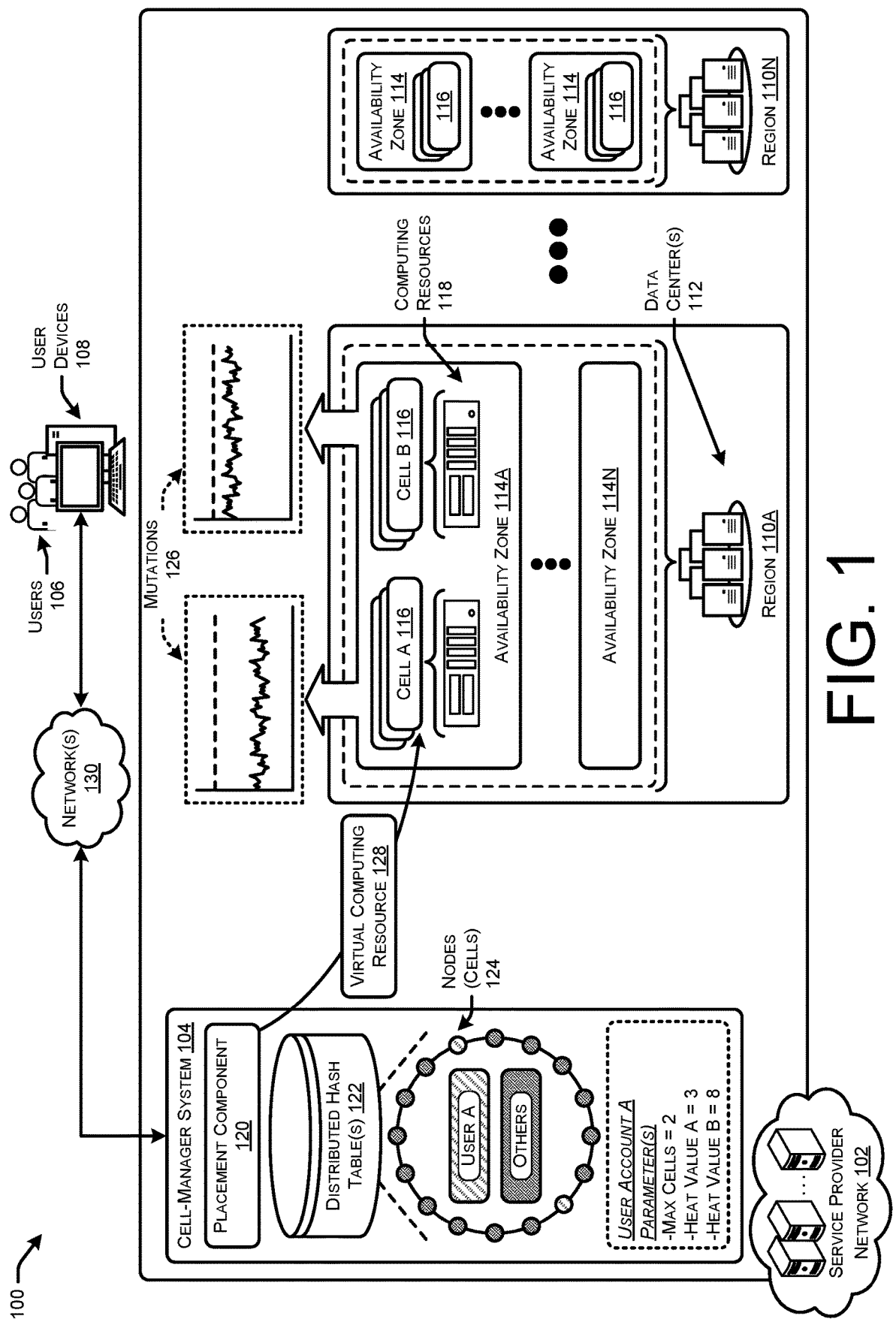
FIG. 1 illustrates a system-architecture diagram of an example environment in which a cell-manager system of a service provider network monitors cells of an availability zone and selects a cell in which to launch a virtual computing resource.

The present disclosure relates to systems and techniques for balancing traffic across different logically isolated cells of a service provider network. Specifically, the present disclosure relates to decomposing resource stacks of availability zones into smaller, isolated cells, and managing the placement of virtual machine instances into the different cells. For example, in one implementation a cloud provider may provision zonal stacks in order to reduce dependency on regional resources, such that zones can continue operating independently of one another. A stack, or service stack, as used herein, refers to a set of components of a service of the cloud provider network, where the service stack supports the launch, management, and/or termination of a type of customer resource, such as virtual machines (VM) (also referred to herein as "virtual machine instances" or "VM instances"), containers, or storage resources, as a few examples. A zonal stack is provisioned entirely within a specific zone of the cloud provider network. Further, in some implementations the cloud provider may decompose such zonal stacks into isolated cellular stacks to offer even higher availability of its services within a zone. The presently disclosed techniques can be used for maintaining a balance of resource usage across zonal cells, for instance by alleviating scaling pressure. For example, a cell manager can monitor which cells are running workloads for which customers, and also the mutation rate per cell (e.g., the rate at which operations are performed that modify the state of instances). This information can be leveraged by a placement component of the service, for example so that instances of a customer are launched in, or migrated to, cells in which the customer already has instances running and that have low mutation rates. Thus, instances can be placed into cells with lower heat scores for heat-spreading, and the number of cells in which customer instances run can be managed to ensure resiliency, but to reduce large amounts of scatter-gather when gathering information for instances of customers.

Service provider networks offer cloud-based services to fulfill users' computing-service needs using computing resources in clusters of data centers that span across different regions, or separate geographical areas. Each region can include two or more availability zones (also known as an "availability domains" or simply "zones") where each availability zone is an isolated failure domain including one or more data center facilities with separate power, separate networking, and separate connectivity with respect to other availability zones. Generally, availability zones within a region may be positioned far enough away from one other that the same event, such as a natural disaster, should not take more than one availability zone offline at the same time.

An availability zone can include one data center, or a cluster of data centers, that include rows of server racks that provide computing resources for users, such as compute processing unit (CPU) resources, memory resources, storage resources, graphics processing unit (GPU) resources, and/or network throughput resources. Availability zones, and associated control-plane processes, are tasked with managing fleets of instances for many different users, and providing steady, predictable performance of on-demand, scalable computing resources. Users generally launch large fleets of virtual computing resources (e.g., virtual machines, containers, serverless functions, etc.) supporting their workloads in availability zones, and these fleets can scale up and down depending on the time of day, week, month, etc. That is, the control-plane systems that help manage the availability zones are tasked with determining or predicting demand, and either adding or removing instances of virtual computing resources based on the demand (and/or increasing and decreasing the size of the virtual computing resources). However, with the growing popularity amongst enterprises of using cloud-based platforms, availability zones have grown in size and in complexity which in turn makes scaling operations more difficult to manage.

This disclosure describes techniques for a service provider network to divide computing resources of availability zones into smaller, isolated partitions (or "cells"), and manage the placement of virtual computing resources into the cells to reduce overconsumption of computing resources in the cells while ensuring ensure resiliency and availability. As virtual computing resources are launched into cells, or migrated between cells, the service provider network may load balance the virtual computing resources on a per-user basis to ensure resiliency and availability across the cells. Further, the service provider network may monitor the number of mutations (e.g., an operation that affects the state of a virtual computing resource) in each cell, as well as utilization rates of the underlying computing resources, and load balance virtual computing resource to maintain stable mutation rates and reduce over utilization (and/or underutilization) of computing resources.

The service provider network has one or more control-plane components or systems to perform at least some of the operations of this disclosure, and are referred to herein collectively as a cell-manager system. Generally, a cell is an isolated failure domain relatively to other cells that is allocated a portion of computing resources of the availability zone, such as a single server or a cluster of servers (and necessary networking). The cell-manager system may add and remove cells to and from an availability zone in order to scale with the number of virtual computing resources running in the availability zone. Further, the cell-manager system is tasked with assigning virtual computing resources to different cells, and migrating the virtual computing resources amongst cells to alleviate overutilization, or prevent underutilization, of computing resources allocated to the cells.

Many different load balancing algorithms exist to, for example, effectively assign a set of virtual computing resources to backend servers, or in this case, cells. One way of distributing the placement of virtual computing resources evenly across cells is to use consistent hashing where a hash function is used to map objects to nodes (or "buckets") in a distributed hash table that is used to distribute the objects among the cells, and ultimately, backend servers. However, this can be problematic as cells are often brought up or down in availability zones, and each of these events may require a large amount of the virtual computing resources to be reassigned and moved to new cells. Accordingly, strictly following consistent hashing can be problematic when it comes to assigning virtual computing resources to cells and servers. Additionally, when a cell crashes using consistent hashing, traditionally the algorithm would simply remap continuous slices or portions of the virtual computing resources in a hash range of that cell to different cells. However, with co-located movements in a tenant- or user-based model, the slices that are moved may be a continuous slice in the hash range of the hash table which may be the same set of users that are continuing to be moved, and the same set of users that continue to see failures in cells.

To avoid the situation where virtual computing resources need to be frequently reassigned and moved to new cells, and to avoid the same set of users experiencing the failures, the cell-manager system may utilize bounded loads for each user account. Generally, the bounded loads techniques used by the cell-manager system can be applied for any load balancing algorithm, such as consistent hashing, round-robin, randomized static, dice-roll, and so forth. For instance, the cell-manager system may define, for individual user accounts, maximum numbers of cells in which the user accounts are permitted to run virtual computing resources. The maximum number of cells may be determined based on how many virtual computing resources the respective user account runs, based on a request received from the particular user account, and/or based on other metrics or heuristics. For example, if the maximum number of cells for a user account is defined as "2," then when a request to launch a virtual computing resource comes in, the cell-manager system may evaluate the hash of the account identifier (ID) and map it to at least one of two cells. Moving forward, additional requests for virtual computing resources to be placed in a cell on behalf on that user account will similarly be mapped to one of the two cells. In this way, resiliency can be achieved for user accounts by permitting the user of multiple cells, based on how many virtual computing resources are running. Additionally, the same set of users will not continue to move from failing cell to failing cell, but will instance be redistributed back to cells in which they currently have, or previously had, virtual computing resources.

In some instances, the cell-manager system may further take into account various utilization metrics for each cell when determining how to load balance virtual computing resources among the cells. As described herein, the term "heat" or "heat value" includes or represents a measure of computing-resource utilization across one or more metrics by the cells. For instance, a heat value for a cell may represent a mutation rate for that cell, where the mutation rate indicates a rate at which operations are performed in the cell that affect the state of a virtual computing resource (e.g., adding a resource, removing a resource, detaching interfaces for resources, dispatching interfaces for resources, and so forth). The greater the mutation rate, the higher the heat value.

Additionally, or alternatively, the heat value may represent resource-utilization metrics for various computing resources, such as CPU, memory, storage, networking, traffic volume and so forth. For instance, if an average of 90% of the allocated CPU in a cell is being utilized by virtual computing resources, the heat value would be higher than if only 40% of the allocated CPU was being utilized by virtual computing resources. The cell-manager system may utilize one or more of the mutation data/metrics, the resource-utilization metrics/data, and/or other data to compute heat values for each of the cells. The cell-manager system may continuously, or periodically, update the heat values for the cells as the various usage metrics change.

In addition to placing virtual computing resources based on a maximum number of permitted cells, as well as cells in which the user accounts have (or had) resources running, the cell-manager system may further take into account the cell heat values. For instance, the cell-manager system may select from among eligible cells in which to launch a virtual computing device based on which cell has lower, or the lowest, heat value. In this way, overheating of cells can be avoided by not only placing virtual computing resources in permitted cells, but in cells that have lower heat values (and more available computing resources).

The cell-manager system may perform various techniques depending on what is occurring with respect to the cells. For instance, the cell-manager system may add or remove cells in availability zones based on demand, and may migrate virtual computing resources between different cells based on cells being overutilized and/or underutilized. Additionally, or alternatively, the cell-manager system may simply refrain from assigning new virtual computing resources to cells that are to be taken down such that the cells eventually empty out as the processes currently assigned to the cells are torn down or finish executing a process.

This application describes techniques that increase the overall utilization of computing resources provided by cells that include servers or other hardware devices, such as CPU, GPU, memory, disk, and/or network availability. The cell-manager system may selectively load balance the placement of virtual computing resources into cells by determining cells that have an availability of resources to support the virtual computing resources. In this way, the techniques described herein help prevent underutilization of computing resources of a service provider network, which reduces the amount of computing resources that are (i) allocated or reserved for cells that are not using them, but (ii) sit idle or unused because the cells are being underutilized by virtual computing resources.

The techniques described herein are with reference to virtual computing devices, which may include any type of virtual computing resource. For example, the techniques are generally applicable to any type of virtual computing resource that is allocated underlying portions of physical computing resources and executes within a virtual machine, or independently executes on the physical computing resources. Such virtual computing resources can include a container, a virtual machine, a serverless network function, processes, software, and/or any other executable that is allocated portions of physical computing resources.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 in which a cell-manager system of a service provider network monitors cells of an availability zone and selects a cell in which to launch a virtual computing resource.

The environment 102 may include a service provider network 102 may is operated and/or managed by a service provider may provide various services to users to fulfil their computing resource needs, such as cloud-based computing resources. For instance, users 106 may operate user devices 108 in order to register for use of the computing resources of the service provider network 102. The service provider network 102 may include a cell-manager system 104 that includes components for managing operations with respect to availability zones, cells, and/or virtual computing resources. Generally, the cell-manager system 104 may be, at least partly, a control-plane system that controls operations occurring in the service provider network. The cell-management system may be either centralized, or distributed, and be supported by one or more computing devices.

In some examples, the service provider network 102 may be or comprise a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable virtual computing resources that can be programmatically provisioned and released in response to user 106 commands. These virtual computing resources can be dynamically provisioned and reconfigured to adjust to variable load. Cloud computing can thus be considered as both the applications delivered as services over a publicly accessible network 130 (e.g., the Internet, a cellular communication network) and the hardware and software in cloud provider data centers 112 that provide those services.

The service provider network 102 may include or be a cloud provider network formed as a number of regions 110, where a region 110 is a separate geographical area in which the cloud provider clusters data centers 112. Each region 110 can include two or more availability zones 114 connected to one another via a private high-speed network, for example a fiber communication connection. An availability zone 114 (also known as an availability domain, or simply a "zone") refers to an isolated failure domain including one or more data center 112 facilities with separate power, separate networking, and separate cooling from those in another availability zone. A data center 112 refers to a physical building or enclosure that houses and provides power and cooling to servers of the cloud provider network. Preferably, availability zones 114 within a region 110 are positioned far enough away from one other that the same natural disaster should not take more than one availability zone offline at the same time. Users 106 can connect to availability zones of the cloud provider network via a publicly accessible network 130 (e.g., the Internet, a cellular communication network) by way of a transit center (TC). TCs can be considered as the primary backbone locations linking users 106 to the cloud provider network, and may be collocated at other network provider facilities (e.g., Internet service providers, telecommunications providers) and securely connected (e.g. via a VPN or direct connection) to the availability zones 114. Each region 110 can operate two or more TCs for redundancy. Regions 110 are connected to a global network which includes private networking infrastructure (e.g., fiber connections controlled by the cloud provider) connecting each region 110 to at least one other region 110. The cloud provider network may deliver content from points of presence outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

By using the service provider network 102, instead of buying, owning, and maintaining their own data centers 112 and servers, organizations can acquire technology such as compute power, storage, databases, and other services on an as-needed basis. The service provider network 102 can provide on-demand, scalable computing services to users through a network, for example allowing users to have at their disposal scalable "virtual computing devices" via their use of the compute servers and block store servers. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users 106 to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users 106 can choose to deploy their virtual computing systems to provide network-based services for their own use and/or for use by their customers or client.

Users 106 may utilize their user devices 108 to connect to the service provider network 102 over one or more networks 130, which may include wired and/or wireless networks such as personal area networks (PANs), wired and wireless local area networks (LANs), wired and wireless wide area networks (WANs), and so forth. The users 106 may request that the service provider network 102 launch fleets of virtual computing resources to support applications or services of the users 106. The fleets of virtual computing resources may be launched across one or more regions 110, and preferable, across multiple availability zones 114 within each of the regions 110.

The cell-manager system 104 may manage the placement of cells 116 in the availability zones 114, as well as launching and/or migrating virtual computing resources between the cells 116. Generally, a cell 116 may be an isolated failure domain relatively to other cells that is allocated a portion of computing resources of the availability zone, such as a single server or a cluster of servers (and necessary networking).

In a cell-based architecture, each cell 116 may be a complete, independent instance of the service and may have a fixed maximum size. As load increases, workloads grow by adding more cells 116. A partition key may be used on incoming traffic to determine which cell 116 will process the request. Any failure may be contained to the single cell 116 it occurs in, so that the number of impaired requests is limited as other cells 116 continue without error. The proper partition key may be identified to minimize cross-cell 116 interactions and avoid the use of complex mapping services in each request.

The cell-manager system 104 may include a placement component 120 that helps manage that placement of virtual computing resources to run on behalf of users 106. The cell-manager system 104 may utilize various types of load balancing algorithms to assign virtual computing resources to cells 116, including consistent hashing where a hash function is used to map virtual computing resources to nodes 124 (or "buckets") in a distributed hash table 122 that is used to distribute the virtual computing resources among the cells 116, and ultimately, backend servers 118.

Generally, each node 124 in the distributed hash table 122 may correspond to a cell 116, and each cell 116 may include or be allocated use of one or more servers (e.g., computing resources 118). The cell-manager system 104 may utilize the distributed hash table 122 to assign virtual computing resources to nodes 124, and thus cells 116. For instance, the cell-manager system 104 may use a hashing algorithm to compute a hash for an account ID as well as other information associated with a virtual computing resource, and map the outputted hash to a node 124 in the distributed hash table 122. The cell-manager system 104 may then place the virtual computing resource on a server (e.g., computing resource 118) that is allocated to, or included in, the cell 116 that corresponds to the node 124.

As illustrated in FIG. 1, user A may have virtual computing resources running in multiple cells 116, and corresponding nodes 124. The cell-manager system 104 may determine that a new virtual computing resource 128 needs to be run on behalf of the user account (e.g., scaling up, new workload, migrating, etc.). The cell-manager system 104 may track which cells 116 are running virtual computing resources of user A and store that data in the distrusted hash table 122. The cell-manager system 104 may utilize bounded loads for each user account, such as user A. to determine how to launch the virtual computing resource.

Generally, the bounded loads techniques used by the cell-manager system 104 can be applied for any load balancing algorithm, such as consistent hashing, round-robin, randomized static, dice-roll, and so forth. For instance, the cell-manager system 104 may define, for individual user accounts, maximum numbers of cells in which the user accounts are permitted to run virtual computing resources. The maximum number of cells 116 may be determined based on how many virtual computing resources 128 the respective user account runs, based on a request received from the particular user account, and/or based on other metrics or heuristics. In this example, the maximum number of cells 116 for user account A is defined as "2," and when a request to launch a virtual computing resource 128 comes in, the cell-manager system 104 may evaluate the hash of the account identifier (ID) and map it to at least one of the two cells 116.

In some instances, the cell-manager system 104 may further take into account various utilization metrics for each cell 116 when determining how to load balance virtual computing resources 128 among the cells 116. As described herein, the term "heat" or "heat value" includes or represents a measure of computing-resource utilization across one or more metrics by the cells 116. For instance, a heat value for a cell 116 may represent mutations 126 over time (or a mutation rate) for that cell 116, where the mutation rate indicates a rate at which operations are performed in the cell 116 that affect the state of a virtual computing resource (e.g., adding a resource, removing a resource, detaching interfaces for resources, dispatching interfaces for resources, and so forth). The greater the mutation rate, the higher the heat value.

As shown, the heat value for cell A 116 is "3," and the heat value for cell B is "8," where the heat values are determined based at least in part on the number of mutations 126 observed over time (or mutation rate). In such an example, the cell-manager system 104 may determine to launch the virtual computing resource 128 on cell A 116, and the placement component 120 may cause the virtual computing resource 128 to be launched on a server in, or allocated to, cell A 116.

Users 106 may create user accounts with the service provider to utilize the resources and services of the service provider network 102. The users 106 may utilize their user devices 108 to communicate over one or more networks 130 (e.g., WANs, PANs, LANs, etc.) with the service provider network 102. The user devices 108 may comprise any type of computing device configured to communicate over network(s) 130, such as mobile phones, tablets, laptop computers, desktop computers, televisions, servers, and/or any other type of computing device. The users 106 may desire that the service provider network 102 host or support workloads on the computing-resource network that is managed by the service provider. Accordingly, the users 106 may, via their user account, request that a virtual computing resource be launched on their behalf, and provide input data via one or more user portals (e.g., web console, command line interface (CLI), application programming interface (API), etc.).

Figure 2:
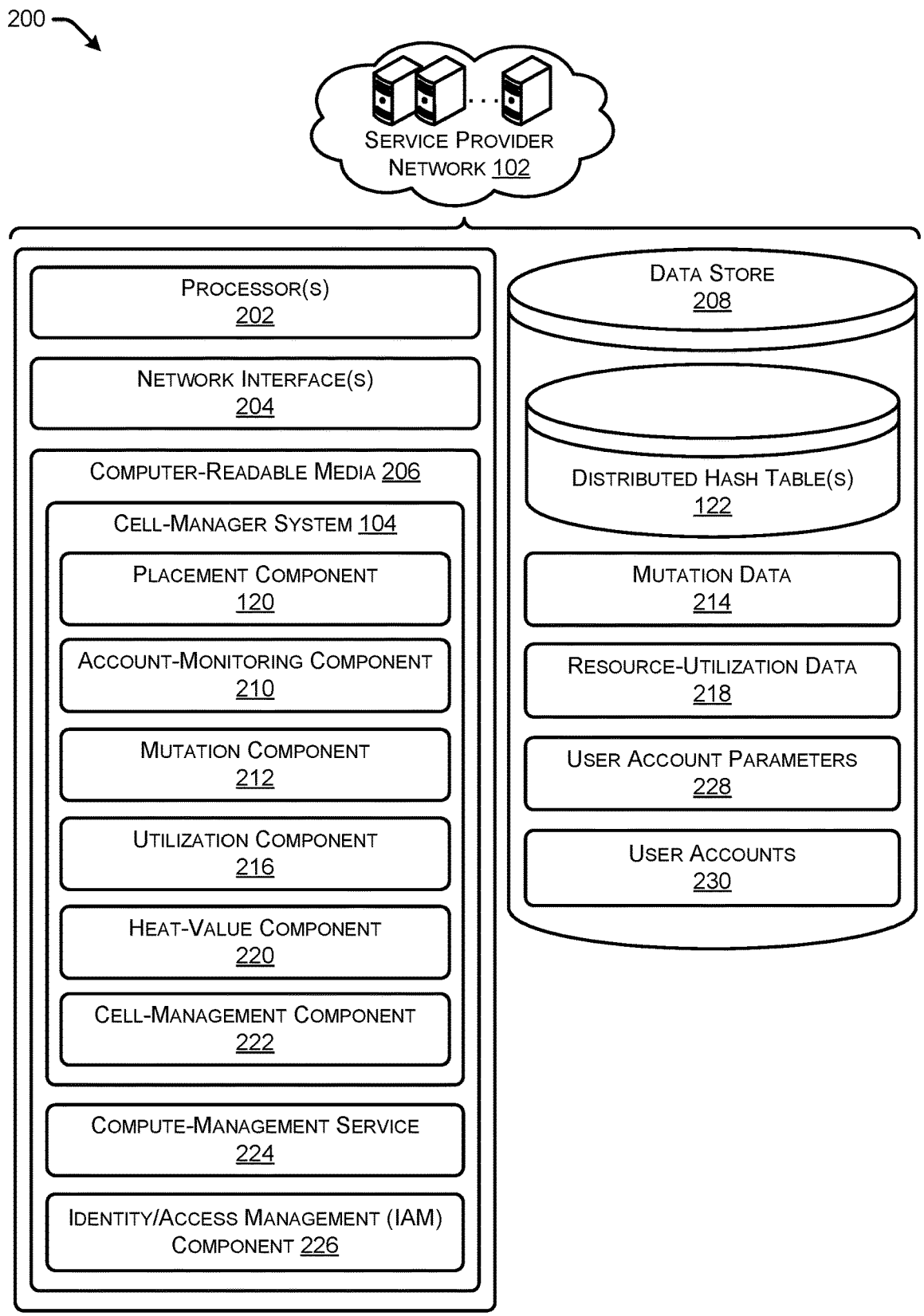
FIG. 2 illustrates a component diagram of example components of a service provider network that monitors cells of availability zones and selects cells in which to launch virtual computing resources.

FIG. 2 illustrates a component diagram 200 of example components of a service provider network 102 that monitors cells 116 of availability zones 114 and determines what cells 116 in which to launch virtual computing resources 128.

As illustrated, the service provider network 102 may include one or more hardware processors 202 (processors), one or more devices, configured to execute one or more stored instructions. The processor(s) 202 may comprise one or more cores. Further, the service provider network 102 may include one or more network interfaces 204 configured to provide communications between the service provider network 102 and other devices, such as the user device(s) 108 and/or other systems or devices in the service provider network 102 and/or remote from the service provider network 102. The network interfaces 204 may include devices configured to couple to personal area networks (PANs), wired and wireless local area networks (LANs), wired and wireless wide area networks (WANs), and so forth.

The service provider network 102 may also include computer-readable media 206 that is used to execute various executable components (e.g., software-based components, firmware-based components, etc.). The computer-readable-media 206 may further execute components to implement functionality described herein. While not illustrated, the computer-readable media 206 may store one or more operating systems utilized to control the operation of the one or more devices that comprise the service provider network 102. According to one embodiment, the operating system comprises the LINUX operating system. According to another embodiment, the operating system(s) comprise the WINDOWS SERVER operating system from MICROSOFT Corporation of Redmond, Washington. According to further embodiments, the operating system(s) can comprise the UNIX operating system or one of its variants. It should be appreciated that other operating systems can also be utilized.

Additionally, the service provider network 102 may include a data store 208 which may comprise one, or multiple, repositories or other storage locations for persistently storing and managing collections of data such as databases, simple files, binary, and/or any other data. The data store 208 may include one or more storage locations that may be managed by one or more database management systems.

The computer-readable media 206 may store portions, or components, of the cell-manager system 104 described herein. For instance, the computer-readable media 206 may store code that is included in the cell-manager system 104 and is supported by computing devices of the cell-manager system 104. As shown, the computer-readable media 206 may store the placement component 120 that is configured to place virtual computing resources in cells 116 based on those cells 116 previously running, or currently running, other virtual computing resources 128 for respective user accounts. Further, the placement component 120 may place virtual computing resources into cells 116 based on heat values of the cells 116.

The computer-readable media 206 may further store an account-monitoring component 210 configured to determine in which cells 116 the user accounts 230 have virtual computing resources running therein. In some instances, the account-monitoring component 210 may determine in what cells 116 the user accounts 230 potentially had virtual computing resources 128, and in what cells 116 the user accounts 230 currently have virtual computing resources 128. For instance, the account-monitoring component 210 may track which cells 116 (or corresponding nodes 124) had virtual computing resources 128 mapped to them, or running in them, by the placement component 120.

In some instances, the account-monitoring component 210 may be utilized to define the maximum number of cells 116 to which user accounts 230 are permitted to map virtual computing resources 128 based on a number of virtual computing resources 128 that the user accounts 230 have running. Generally, the higher number of virtual computing resources 128 running on behalf of a user account 230, the greater the number of maximum cells 116 that are permitted for the user account 230. In some instances, the account-monitoring component 210 may calculate the number of possible cells 116 in which a user account may be running virtual computing resources 128. For instance, the account-monitoring component 210 may use the hashing function and the user account ID (or other information) to calculate the number of possible hashes, and thus nodes 124, to which the user account may map. However, in other instances, the account-monitoring component 210 may simply have a process, or thread, that periodically determines which user accounts 230 have virtual computing resources 128 in what cells 116, and thus nodes 124, in the distributed hash table 122.

The computer-readable media 206 may further store a mutation component 212 configured to generate mutation data 214. The mutation component 212 may monitor the cells 116 and virtual computing resources 128 running therein to determine a number of mutations occurring during periods of time. Generally, the mutation data 214 may represent any operation that affects the state of a virtual computing resource 128 in each cell 116. Generally, the operations that affect the state of a virtual computing resource 128 may include adding a resource, removing a resource, detaching interfaces for resources, dispatching interfaces for resources, and so forth. The greater the mutation rate, the higher the heat value. The computer-readable media 206 may further store a heat-value component 220 configured to determine heat values based on mutation data 214, resource-utilization data 218, and/or other metrics. The mutation component 212 may track what operations were performed in or dispatched for each cell 116, and determine a type of the operation (e.g., add a resource, remove resource, detach interfaces, dispatch interfaces, etc.). The mutation component 212 may then calculate mutation rates for each cell 116 that indicate a number of mutations over time.

The computer-readable media 206 may further store code for a utilization component 216 to obtain resource-utilization data 218. The resource-utilization data 218 may include data such as CPU utilization, memory utilization, storage utilization, network bandwidth utilization, traffic flow, and/or other resource utilization. The resource-utilization data 218 may indicate resource lows and peaks during periods of time, average utilizations during periods of time, account-specific utilization data, cell-specific utilization data, and/or any other metric indicating utilization of computing resources by virtual computing resources 128.

The computer-readable media 206 may further store code for a heat-value component 216 to determine heat values on a per-account basis, a per-cell basis, and/or other basis. The heat-value component may take into account various utilization metrics for each cell 116 and/or account when determining heat values. Generally, the term "heat" or "heat value" includes or represents a measure of computing-resource utilization across one or more metrics by the cells 116 and/or user accounts. For instance, the heat-value component 216 may determine a heat value for a cell 116 that represents a mutation rate for that cell 116, where the mutation rate indicates a rate at which operations are performed in the cell that affect the state of all virtual computing resources 128 in the cell 116 (e.g., per-cell basis), or only virtual computing resources 128 running for a particular user account (e.g., per-account basis). The greater the mutation rate, the higher the heat value.

In addition to, or as an alternative to, using the mutation data 214 to calculate heat values, the heat-value component 220 may also utilize the resource-utilization data 218. For instance, the heat-value component 220 calculate a heat value that represents resource-utilization metrics for the cells 116, such as CPU utilization, memory utilization, storage utilization, networking utilization, traffic volume, and so forth. For instance, if an average of 90% of the allocated CPU in a cell 116 is being utilized by virtual computing resources 128, the heat value would be higher than if only 40% of the allocated CPU was being utilized by virtual computing resources 128. The heat-value component 220 may utilize one or more of the mutation data 214, the resource-utilization data 218, and/or other data to compute heat values for each of the cells 116 (on a per-cell basis or a per-account basis). The heat-value component 220 may continuously, or periodically, update the heat values for the cells 116 as the various usage metrics change.

A cell-management component 222 may perform various operations for determining to add, remove, and/or modify cells 116. For instance, if one or more of the cells 116 have heat values above a threshold heat value, the cell-management component 222 may determine that another cell 116 needs to be added to help with handling the load. As another example, the cell-management component 222 may predict that demand for computing resources will increase, or decrease, in the future and add or remove cells 116 based on these predictions.

It should be noted that, in addition to placing virtual computing resources 128 based on a maximum number of permitted cells 116, as well as cells 116 in which the user accounts 230 have (or had) resources running, the cell-manager system 104 may further take into account the cell 116 heat values. For instance, the cell-manager system 104 may select from among eligible cells 116 in which to launch a virtual computing device 128 based on which cell 116 has lower, or the lowest, heat value. In this way, overheating of cells 116 can be avoided by not only placing virtual computing resources 128 in permitted cells 116, but in cells 116 that have lower heat values (and more available computing resources 118).

The computer-readable media 206 may further store code for a compute-management service 224, which may be implemented by one, or multiple, computing devices of the service provider network 102. Generally, the compute-management service 224 may be a service of the service provider network 102 that provides secure, resizable compute capacity and manages the computing resources of the distributed computing network. The compute-management service 224 may be referred to in various implementations as an elastic compute service, a virtual machines service, a computing cloud service, a compute engine, or a cloud compute service. In some examples, the compute-management service 224 may perform various functions for managing the distributed computing network, such as provisioning VM instances, migrating workloads between VM instances, providing auto-scaling for fleets of VM instances, configuring VM instances and/or workloads, and/or performing any other functions for managing the distributed computing network.

To utilize the services provided by the service provider network 102, users 106 may register for an account 230 with the service provider network 102. For instance, users 106 may utilize a user device 108 to interact with an identity and access management (IAM) component 226 that allows the users to create user accounts 230 with the service provider network 102. Generally, the IAM component 226 may enable the users to manage their virtual computing resources and other computing resources securely.

The computer-readable media 206 may be used to store and retrieve information, such as program modules, data structures, or other data. It should be appreciated by those skilled in the art that computer-readable storage media is any available media that provides for the non-transitory storage of data and that can be accessed by the service provider network 102. In some examples, the operations performed by the service provider network 102, and or any components included therein, may be supported by one or more server devices. Stated otherwise, some or all of the operations performed by the service provider network 102, and or any components included therein, may be performed by one or more computer devices operating in a cloud-based arrangement.

By way of example, and not limitation, computer-readable storage media 206 can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

Figure 3:
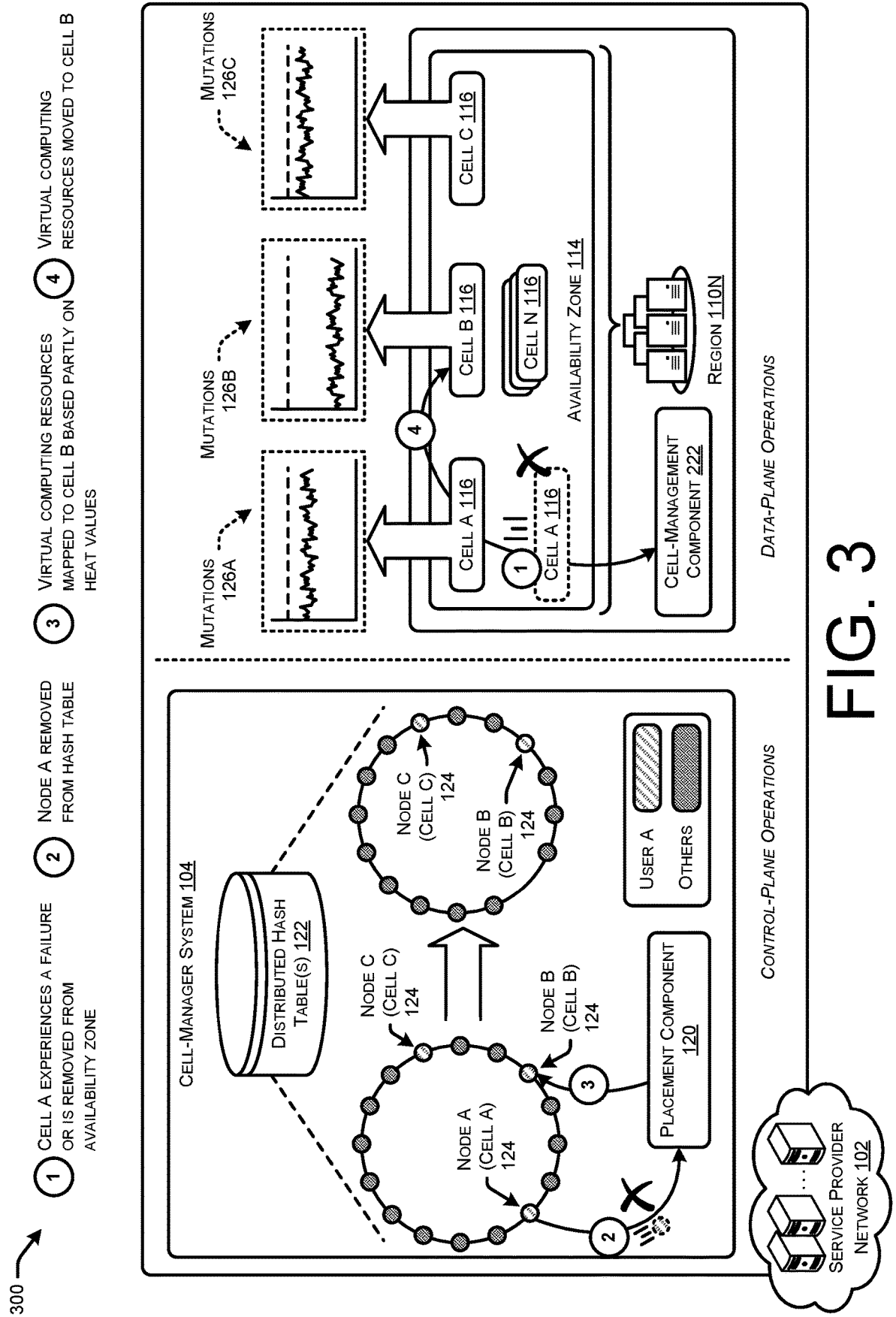
FIG. 3 illustrates a system-architecture diagram of an example environment in which a cell-manager system determines that a cell has been removed from the availability zone and maps virtual computing resources to other cells.

FIG. 3 illustrates a system-architecture diagram of an example environment in which a cell-manager system determines that a cell has been removed from the availability zone and maps virtual computing resources from the removed cell into other cells.

At "1," the cell-management component 222 may determine that cell A 116 has experienced a failure, is scheduled to be removed, or otherwise experiences an event that causes cell A 116 to be removed from the availability zone 114.

At "2," the placement component 120 may remove node A 124, which corresponds to cell A 116, from the distributed hash table 122. In some instances, such as when the cell A 116 is scheduled to be removed, the placement component 120 may refrain from placing or launching new virtual computing resources 128 into cell A 116 and monitor the running virtual computing resources 128 that are in cell A 116. As the virtual computing resources 128 complete running their processes, they will spin down or be de-provisioned. Once the cell A 116 no longer has any virtual computing resources 128 running therein, the cell-management component 222 may remove the cell A 116.

At "3," the placement component 120 may map new virtual computing resources 128 into node B 124, and thus cell B 116 based at least in part on heat values for cell B 116 and cell C 116. For instance, the placement component 120 may determine that cells B and C 116 are running other virtual computing resources 128 on behalf of user account A, and further identify the heat values for cell B and C 116. As shown, the mutations 126B for cell B 116 are lower, on average, than the mutations 126C for cell C 116. Thus, the heat value for cell B 116 would be lower than that for cell C 116, and the placement component 120 would map new virtual computing resources for user account A to node V 124, and thus cell B.

In some instances, the placement component 120 may additionally map the virtual computing resource 124 that were running in node A 124, and cell A 116, and migrate them into node B 124, and thus cell B 116.

Figure 4:
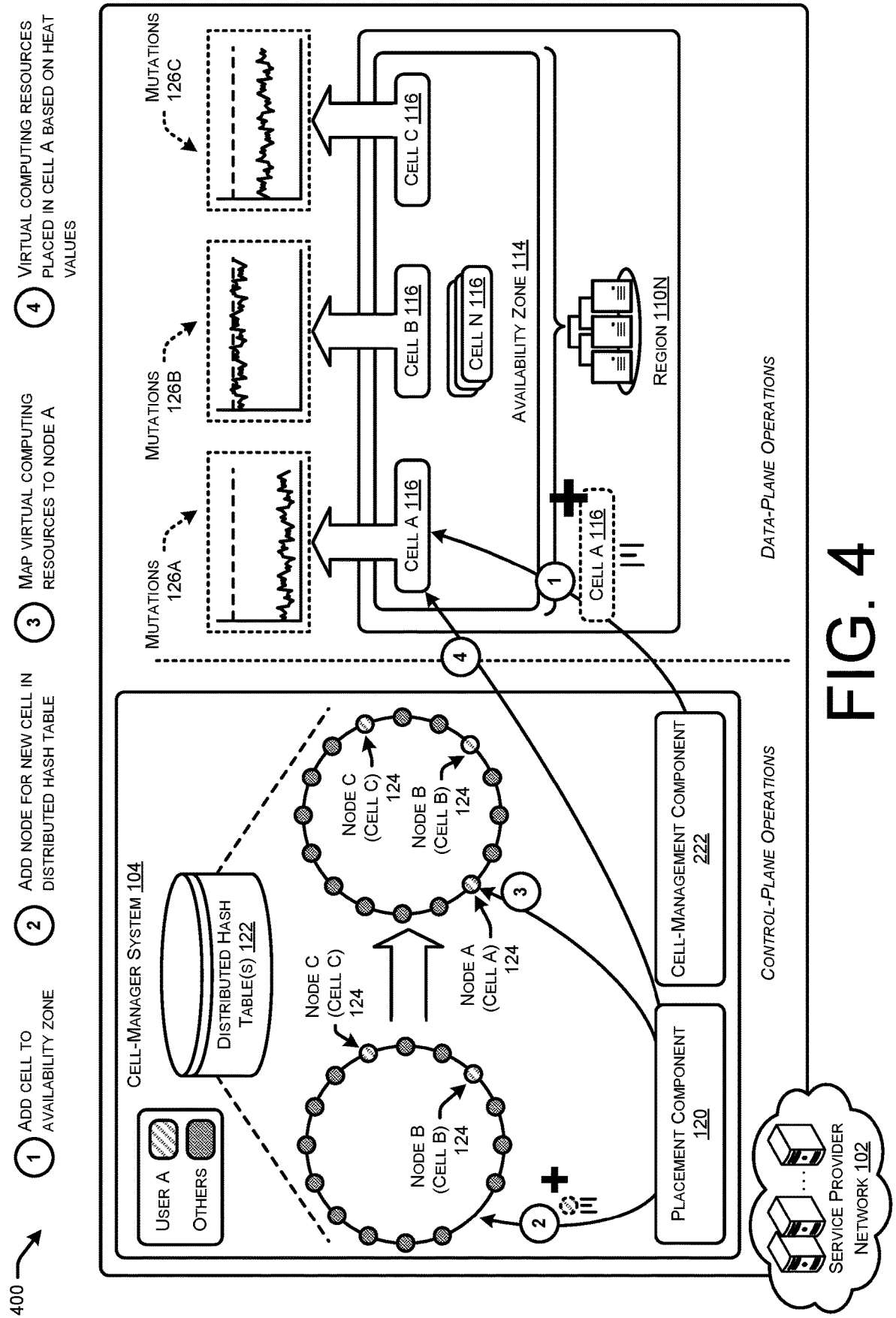
FIG. 4 illustrates a system-architecture diagram of an example environment in which a cell-manager system determines that a new cell has been added to the availability zone and maps virtual computing resources into the new cell.

FIG. 4 illustrates a system-architecture diagram 400 of an example environment in which a cell-manager system 104 determines that a cell 116 has been added to the availability zone 114 and maps virtual computing resources 128 into the new cell 116. At "1," the cell-management component 222 may add a new cell A 116 to the availability zone 114. The cell-management component 222 may decide to add new cell A 116 to increases in demand, and/or predicted increases in demand.

At "2," the placement component 120 may add a node 124 to the distributed has table 122 that corresponds to, or represents, the new cell A 116. At "3," the placement component 120 may map virtual computing resources to the new node A 124, and thus new cell A 116. For instance, the cell A 116 has a lower rate of mutations 126A as compared to cells B and C 116, and thus a lower heat value.

At "3," the placement component 120 may map new virtual computing resources 128 to the new node A 124, and thus cell A 116, based on the heating values of the cells 116. In some instances, the placement component 120 may additionally map virtual computing resources 128 that were running in cell B 116 to run in cell A 116 (e.g., map the virtual computing resources 128 from node B 124 into node A 124). For instance, the heat value for cell B 116 may violate a permissible heat value threshold, and the placement component 120 may map one or more virtual computing resources 128 from node B 124 into node A 124.

At "4," the placement component 120 may place new virtual computing resources 128 in cell A 116, based on the heating values of the cells 116. In some instances, the placement component 120 may additionally migrate virtual computing resources 128 that were running in cell B 116 to run in cell A 116 (e.g., map the virtual computing resources 128 from node B 124 into node A 124). For instance, the heat value for cell B 116 may violate a permissible heat value threshold, and the placement component 120 may map one or more virtual computing resources 128 from node B 124 into node A 124.

Figure 5:
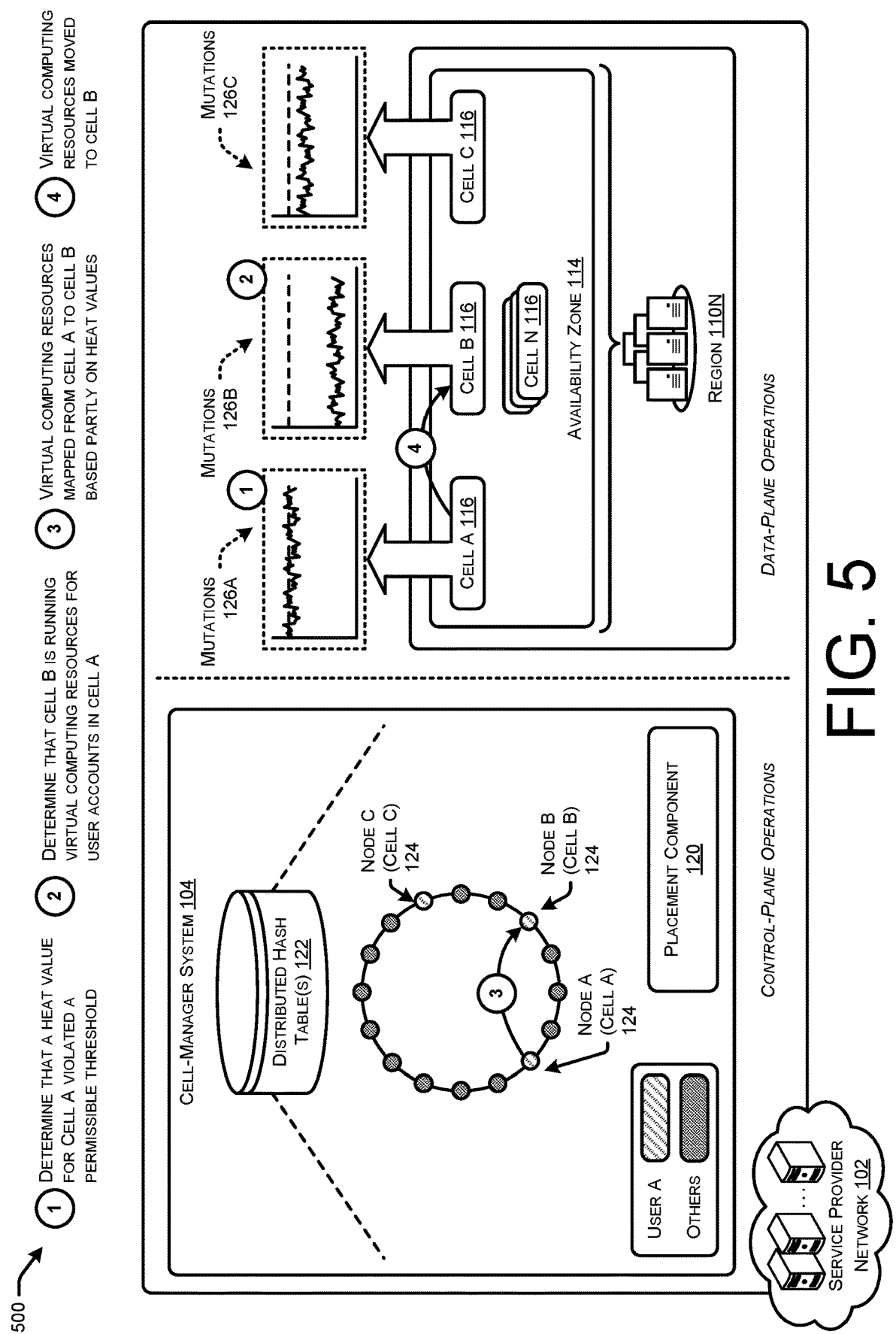
FIG. 5 illustrates a system-architecture diagram of an example environment in which a cell-manager system determines that a heat value of a cell is above a permissible threshold value, and maps virtual computing resources into another cell of the availability zone.

FIG. 5 illustrates a system-architecture diagram of an example environment 500 in which a cell-manager system 104 determines that a cell 116 has a heat value that is above a permissible threshold value, and avoids mapping virtual computing resources 128 to the overheated cell 116.

At "1," the placement component 120 may determine that a heat value for cell A 116 violated a permissible threshold. The permissible threshold may be associated with performance of the cell A 116 experiencing performance degradation, or moving towards performance degradation (e.g., overutilization of computing resources).

At "2," the account-monitoring component 210 may determine that cell B 116 is running virtual computing resources 128 for user accounts that have resources 128 running in cell A 116 as well. At "3," the placement component 120 may map, and migrate, virtual computing resources 128 from cell A to cell B based at least in part on the heat values. In some instances, rather than mapping/migrating virtual computing resources 128 between cells 116, the placement component 120 may instead refrain from assigning new virtual computing resources 128 to the overheated cell A 116, and slowly let the number of virtual computing resources 128 running in the overheated cell A 116.

At "4," the virtual computing resources 128 may be migrated out of cell A 116 and in to cell B 116, and/or new virtual computing resources 128 being placed by the placement component 120 may be placed into cell B 116 (and not cell A 116) until the heat value for cell A 116 has dropped below the permissible threshold.

Figure 6:
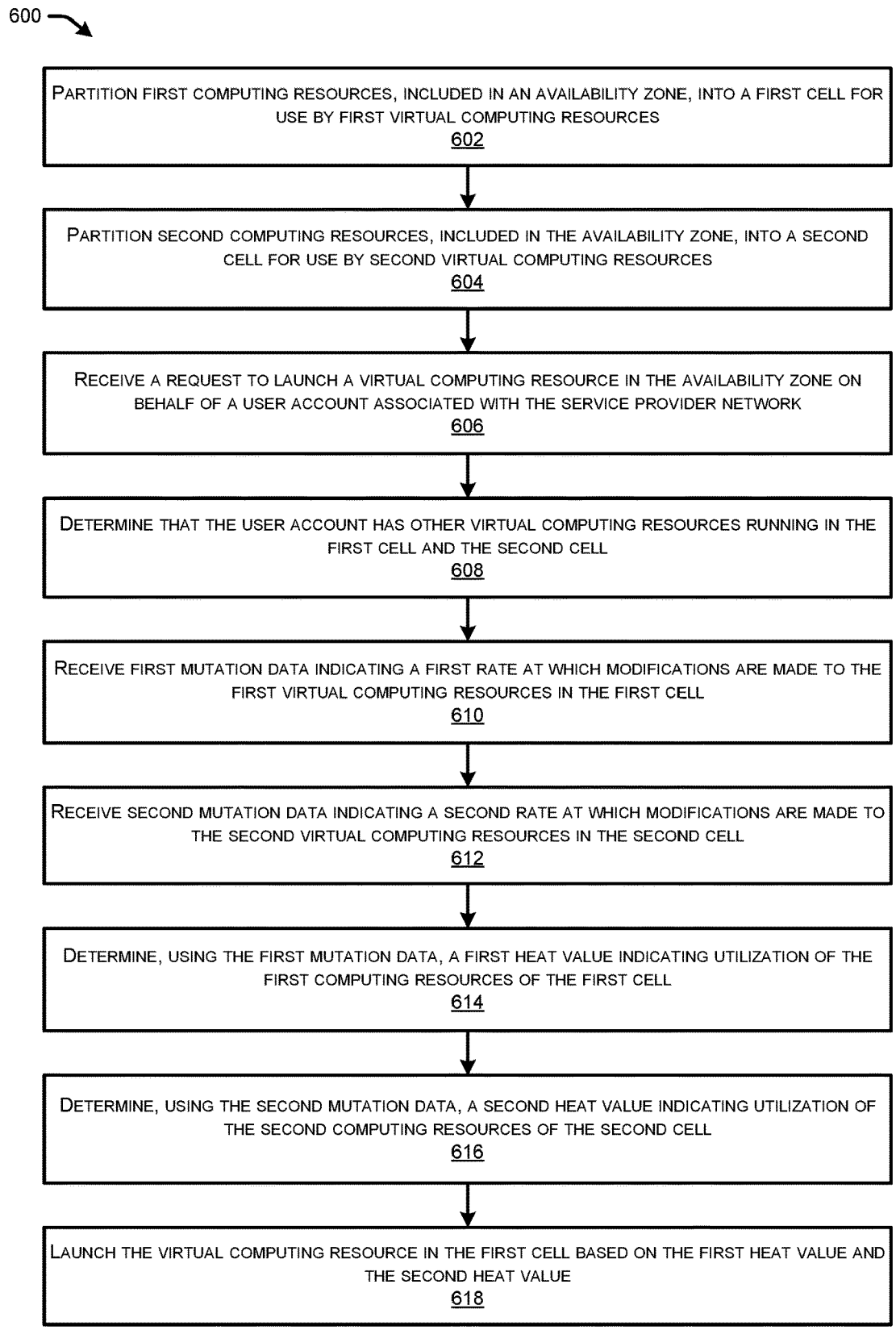
FIG. 6 illustrates a flow diagram of an example method for a cell-manager system to determine a cell in which to launch a virtual computing resource on behalf of a user account based on the cell running other virtual computing resources on behalf of the user account and a heat value for the cell.
Figure 7:
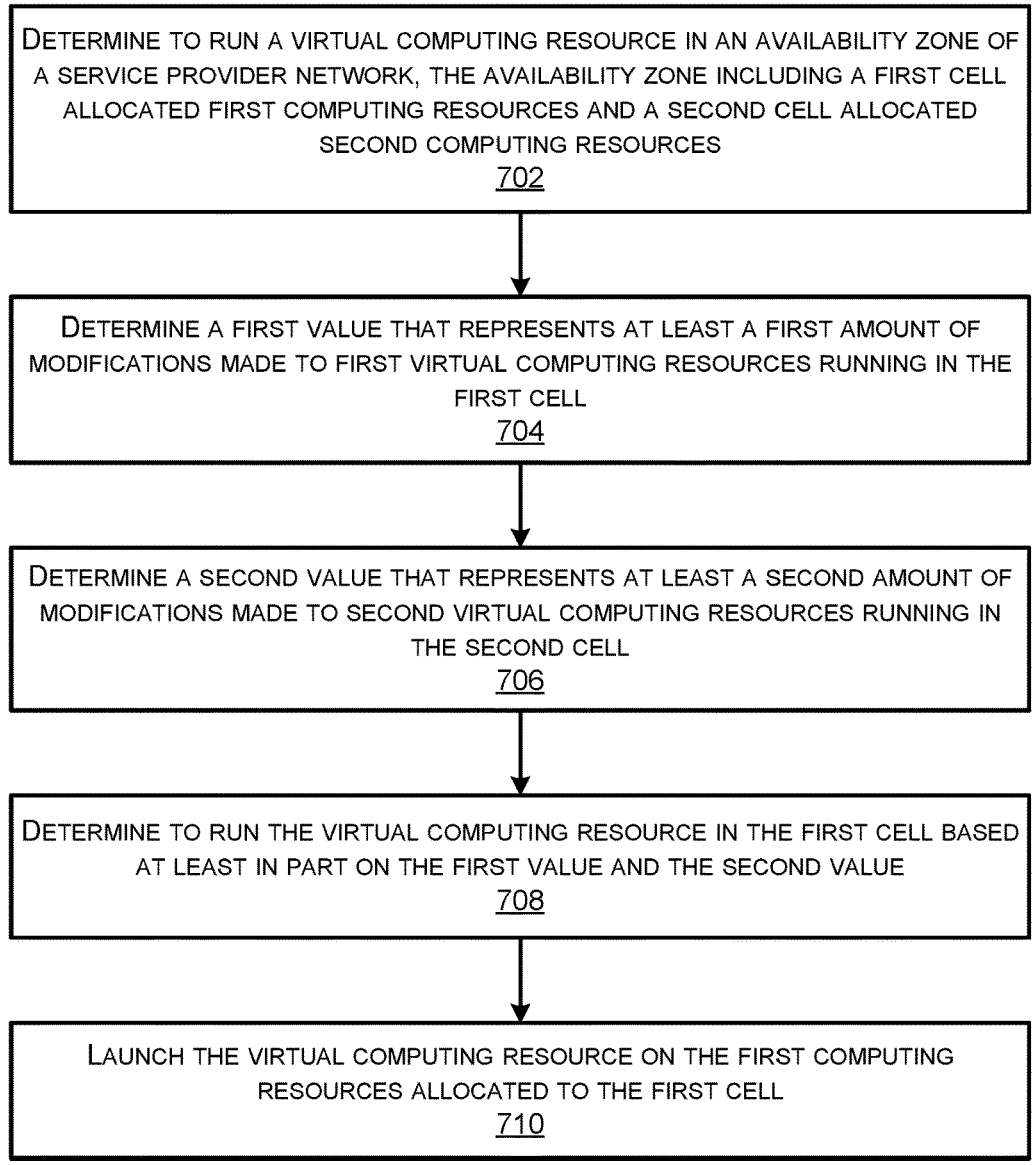
FIG. 7 illustrates a flow diagram of an example method for a cell-manager system to select a cell in which to launch a virtual computing resource on behalf of a user account based on a value indicating an amount of modifications made to resources in the cell.
Figure 8:
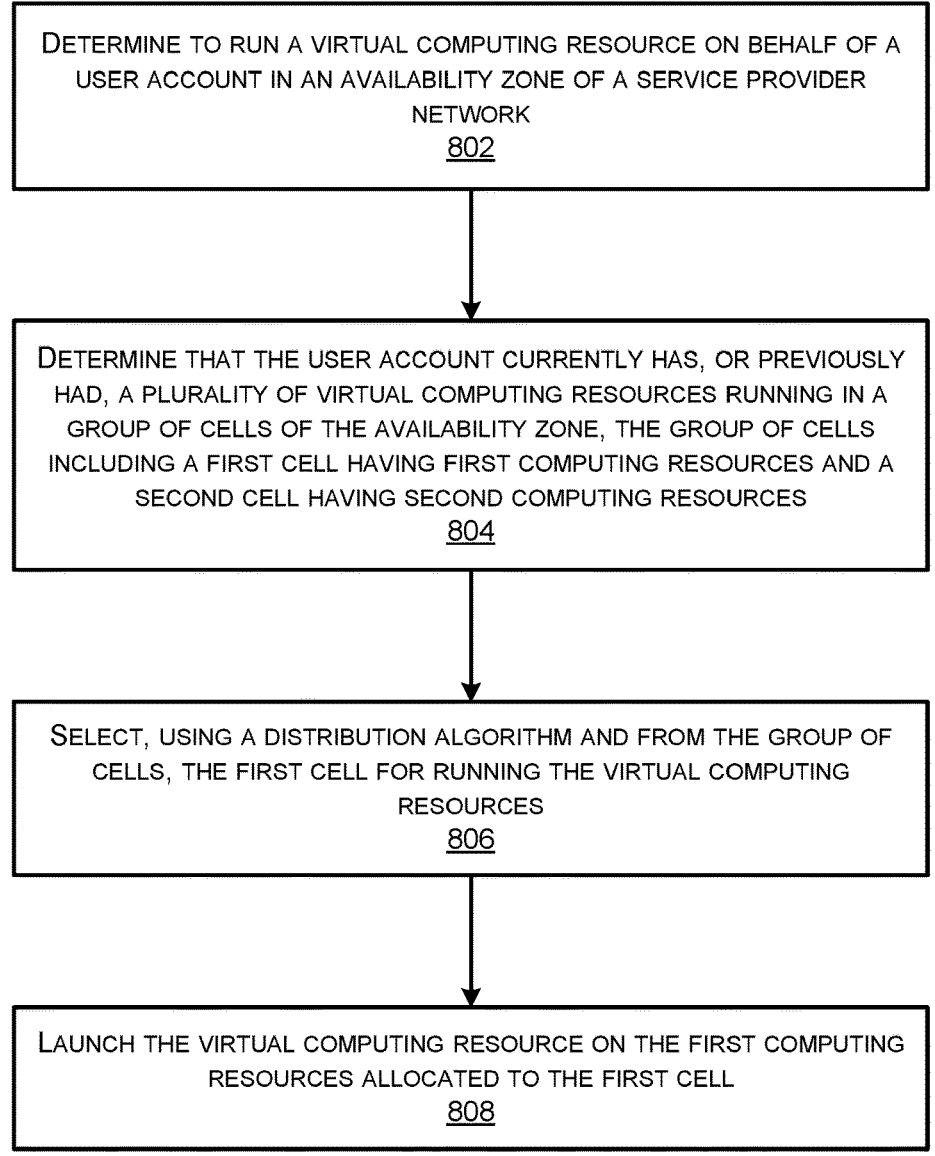
FIG. 8 illustrates a flow diagram of an example method for a cell-manager system to select a cell in which to launch a virtual computing resource on behalf of a user account based on the cell already running, or having previous run, other virtual computing resources on behalf of the user account.

FIGS. 6-8 illustrate flow diagrams of example methods 600, 700, and 800 that illustrate aspects of the functions performed at least partly by the service provider network 102 as described in this disclosure. The logical operations described herein with respect to FIGS. 6-8 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 6-8 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components. As described herein, a virtual computing resource may comprise one or more of a VM instance, a virtual container, a serverless function, a program, and/or any other virtual representation FIG. 6 illustrates a flow diagram of an example method 600 for a cell-manager system 104 to determine a cell in which to launch a virtual computing resource on behalf of a user account based on the cell 116 running other virtual computing resources on behalf of the user account and a heat value for the cell 116. In some examples, the cell-manager system 104 may include a plurality of data centers located in geographic regions of a service provider network, the plurality of data centers 112 comprising computing resources that are grouped into availability zones 114 with isolated failure domains. Further, the cell-manager system 104 may include one or more processors and one or more computer-readable media storing computer-executable instructions that, when executed by the one or more processors, cause the one or more processors to perform the operations of method 600.

At 602, the cell-manager system 104 may partition first computing resources, included in an availability zone, into a first cell for use by first virtual computing resources. For instance, the cell manager system 104 may allocate portions of the first computing resources 118 of the availability zone 114 to be used exclusively by first virtual computing resources 128 in a first cell A 116.

At 604, the cell-manager system 104 may partition second computing resources, included in the availability zone, into a second cell for use by second virtual computing resources. For instance, the cell manager system 104 may allocate portions of the second computing resources 118 of the availability zone 114 to be used exclusively by second virtual computing resources 128 in a second cell B 116.

At 606, the cell-manager system 104 may receive a request to launch a virtual computing resource in the availability zone on behalf of a user account associated with the service provider network. For instance, the cell-manager system 104 may determine that a new virtual computing resource 128 is needed, or will be needed, to support an existing workload (or new workload) of a user account 230.

At 608, the cell-manager system 104 may determine that the user account has other virtual computing resources running in the first cell and the second cell. For instance, the cell-management component 222 may determine that cell A and cell B 116 previously had virtual computing resources 128 launched in the cells A and B 116, and/or currently has virtual computing resources 128 running in the cells A and B 116.

At 610, the cell-manager system 104 may receive first mutation data indicating a first rate at which modifications are made to the first virtual computing resources in the first cell. For instance, the mutation component 212 may monitor the first cell A 116 and determine a first number of mutations occurring in the first cell A 116 over a period of time.

At 612, the cell-manager system 104 may receive second mutation data indicating a second rate at which modifications are made to the second virtual computing resources in the second cell. For instance, the mutation component 212 may monitor the second cell A 116 and determine a second number of mutations occurring in the second cell A 116 over a period of time.

At 614, the cell-manager system 104 may determine, using the first mutation data, a first heat value indicating utilization of the first computing resources of the first cell. At 616, the cell-manager system 104 may determine, using the second mutation data, a second heat value indicating utilization of the second computing resources of the second cell. Generally, the greater the number of mutations indicated in the mutation data, the higher the respective heat values.

At 618, the cell-manager system 104 may launch the virtual computing resource in the first cell based on the first heat value and the second heat value. For instance, the cell-manager system 104 may determine that the first heat value of the first cell A 116 is lower than the second heat value of the second cell B 116.

FIG. 7 illustrates a flow diagram of an example method 700 for a cell-manager system 104 to select a cell 116 in which to launch a virtual computing resource 128 on behalf of a user account 230 based on a value indicating an amount of modifications made to resources in the cell 116.

At 702, the cell-manager system 104 may determine to run a virtual computing resource in an availability zone of a service provider network, the availability zone including a first cell allocated first computing resources and a second cell allocated second computing resources. For instance, the cell-management component 222 may determine that an amount of demand is increasing, or predict that it will increase, and that another virtual computing resource 128 is necessary.

At 704, the cell-manager system 104 may determine a first value that represents at least a first amount of modifications made to first virtual computing resources running in the first cell. For instance, the heat-value component 220 may calculate a heat value for the first cell 116 based at least in part on mutation data 214 computed for the first cell 116.

At 706, the cell-manager system 104 may determine a second value that represents at least a second amount of modifications made to second virtual computing resources running in the second cell. For instance, the heat-value component 220 may calculate a heat value for the second cell 116 based at least in part on mutation data 214 computed for the second cell 116.

In some instances, the method 700 may further include receiving utilization data 218 indicating at least one of an amount of network traffic associated with the first cell 116, or an amount of a resource type utilized by the first virtual computing resources 128, the resource type being at least one of a central processing unit (CPU) resource type, a memory resource type, or a storage resource type. Further, the method 700 may include calculating the first value based at least in part on the mutation data 214 and the utilization data 218.

At 708, the cell-manager system 104 may determine to run the virtual computing resource in the first cell based at least in part on the first value and the second value. For instance, the cell-manager system 104 may determine that the heat value for the first cell 116 is less than heat value for the second cell 116.

At 710, the cell-manager system 104 may launch the virtual computing resource on the first computing resources allocated to the first cell.

FIG. 8 illustrates a flow diagram of an example method 800 for a cell-manager system 104 to select a cell 116 in which to launch a virtual computing resource on behalf of a user account based on the cell 116 already running, or having previous run, other virtual computing resources on behalf of the user account.

At 802, the cell-manager system 104 may determine to run a virtual computing resource on behalf of a user account in an availability zone of a service provider network. For instance, the cell-management component 222 may determine that an amount of demand is increasing, or predict that it will increase, and that another virtual computing resource 128 is necessary.

At 804, the cell-manager system 104 may determine that the user account 230 currently has, or previously had, a plurality of virtual computing resources 128 running in a group of cells 116 of the availability zone 114, the group of cells 116 including a first cell 116 having first computing resources 118 and a second cell 116 having second computing resources 118.

At 806, the cell-manager system 104 may select, using a distribution algorithm and from the group of cells, the first cell for running the virtual computing resources. In some instances, the cell-manager system 104 may utilize bounded loads for each user account 230. Generally, the bounded loads techniques used by the cell-manager system 104 can be applied for any load balancing algorithm, such as consistent hashing, round-robin, randomized static, dice-roll, and so forth. At 808, the cell-manager system 104 may launch the virtual computing resource on the first computing resources allocated to the first cell.

Figure 9:
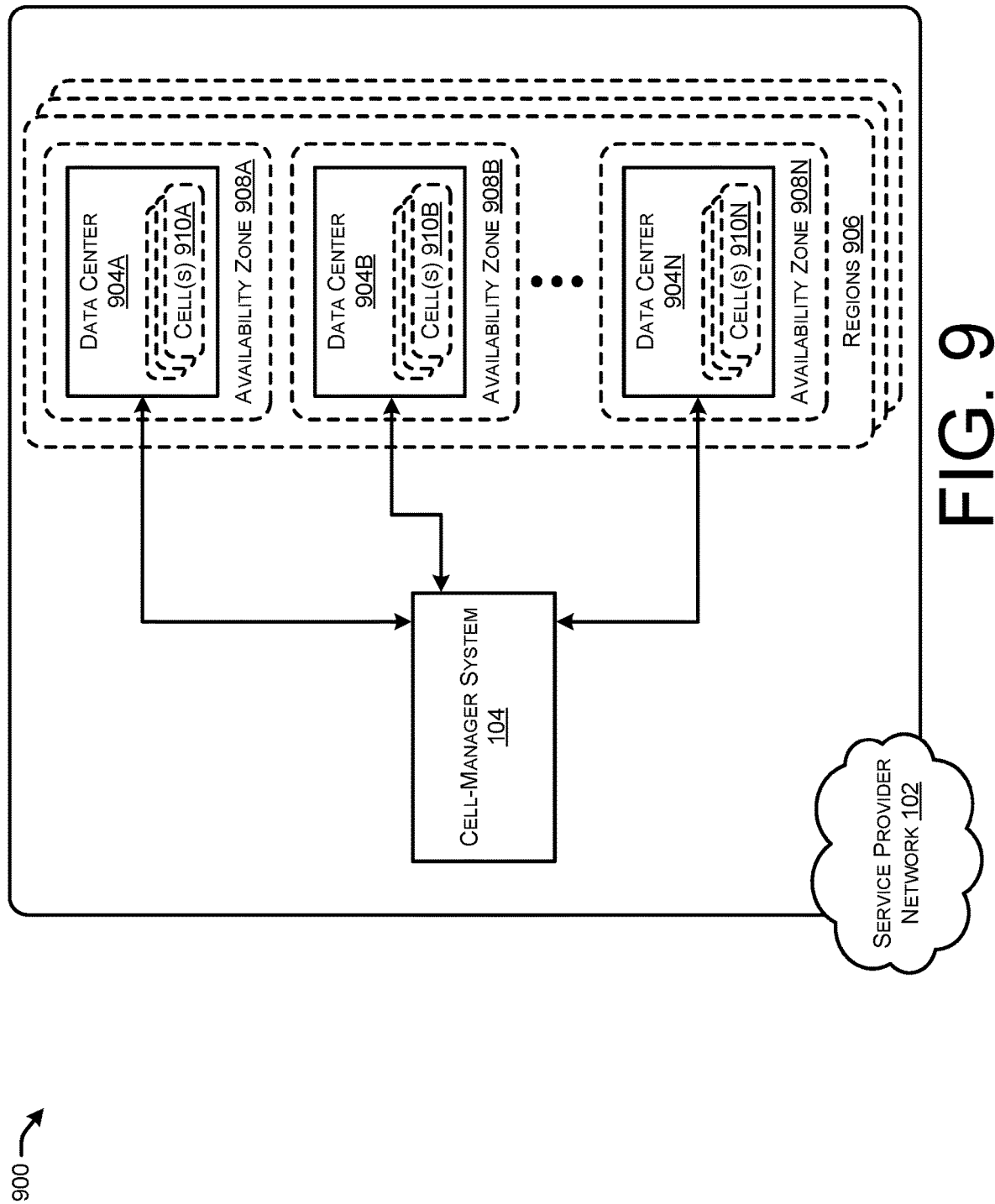
FIG. 9 is a system and network diagram that shows an illustrative operating environment that includes data centers of a service provider network that can be configured to implement aspects of the functionality described herein.

FIG. 9 is a system and network diagram 900 that shows an illustrative operating environment that includes data centers 904 in one or more regions 906 of a service provider network 102 that can be configured to implement aspects of the functionality described herein. The service provider network 102 can provide computing resources, like VM instances and storage, on a permanent or an as-needed basis. Among other types of functionality, the computing resources provided by the service provider network 102 may be utilized to implement the various services described above. As also discussed above, the computing resources provided by the service provider network 102 can include various types of computing resources, such as data processing resources like VM instances, data storage resources, networking resources, data communication resources, network services, and the like.

Each type of computing resource provided by the service provider network 102 can be general-purpose or can be available in a number of specific configurations. For example, data processing resources can be available as physical computers or VM instances in a number of different configurations. The VM instances can be configured to execute applications, including web servers, application servers, media servers, database servers, gaming applications, some or all of the network services described above, and/or other types of programs. Data storage resources can include file storage devices, block storage devices, and the like. The service provider network 102 can also be configured to provide other types of computing resources not mentioned specifically herein.

The computing resources provided by the service provider network 102 may be enabled in one embodiment by one or more data centers 904A-904N (which might be referred to herein singularly as "a data center 904" or in the plural as "the data centers 904"). The data centers 904 are facilities utilized to house and operate computer systems and associated components. The data centers 904 typically include redundant and backup power, communications, cooling, and security systems. The data centers 904 can also be located in geographically disparate locations, or regions 906. One illustrative embodiment for a data center 904 that can be utilized to implement the technologies disclosed herein will be described below with regard to FIG. 10.

The data centers 904 may be accessible over any wired and/or wireless network(s), which can be a wide area communication network ("WAN"), such as the Internet, an intranet or an Internet service provider ("ISP") network or a combination of such networks. For example, and without limitation, a user of the service provider network 102 may access the service provider network 102 by way of the network(s) 130. It should be appreciated that a local-area network ("LAN"), the Internet, or any other networking topology known in the art that connects the data centers 904 to remote clients and other users can be utilized. It should also be appreciated that combinations of such networks can also be utilized.

As shown, the data centers 904 may be the same as or similar to data centers 112, and may be clustered into availability zones 908, which may be the same as or similar to availability zones 114. Further, the availability zones 908 may each include multiple cells 910, which may be the same or similar to cells 116. The cell-manager system 104 may be communicatively connected to the different data centers 904 to cause the operations described herein to be performed.

Figure 10:
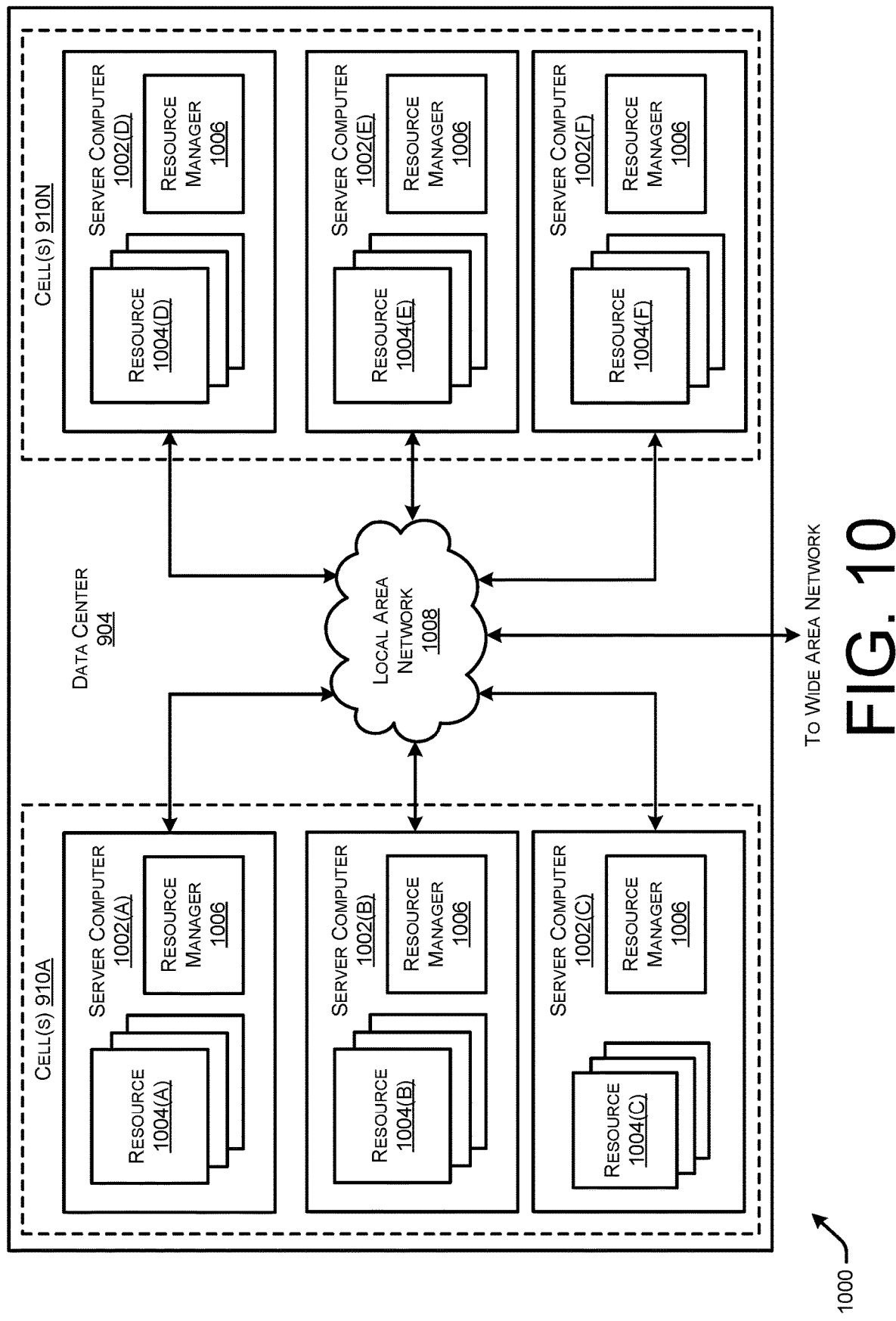
FIG. 10 is a computing system diagram illustrating a configuration for a data center that can be utilized to implement aspects of the technologies disclosed herein.

FIG. 10 is a computing system diagram 1000 that illustrates one configuration for a data center 904 that implements aspects of the technologies disclosed herein. The example data center 904 shown in FIG. 10 includes several server computers 1002A-1002F (which might be referred to herein singularly as "a server computer 1002" or in the plural as "the server computers 1002") for providing computing resources 1004A-1004E.

The server computers 1002 can be standard tower, rack-mount, or blade server computers configured appropriately for providing the computing resources described herein (illustrated in FIG. 10 as the computing resources 1004A-1004E). As mentioned above, the computing resources provided by the service provider network 102 can be data processing resources such as VM instances or hardware computing systems, database clusters, computing clusters, storage clusters, data storage resources, database resources, networking resources, and others. Some of the servers 1002 can also be configured to execute a resource manager 1006 capable of instantiating and/or managing the computing resources. In the case of VM instances, for example, the resource manager 1006 can be a hypervisor or another type of program configured to enable the execution of multiple VM instances on a single server computer 1002. Server computers 1002 in the data center 1004 can also be configured to provide network services and other types of services.

In the example data center 904 shown in FIG. 10, an appropriate LAN 1008 is also utilized to interconnect the server computers 1002A-1002F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 904A-904N, between each of the server computers 1002A-1002F in each data center 904, and, potentially, between computing resources in each of the server computers 1002. It should be appreciated that the configuration of the data center 904 described with reference to FIG. 10 is merely illustrative and that other implementations can be utilized.

As illustrated, the data center 904 shown in FIG. 10 also includes a server computer 1002F that can execute some or all of the software components described above. The server computer 1002F can also be configured to execute other components and/or to store data for providing some or all of the functionality described herein. As illustrated, the data center 904 shown in FIG. 10 includes multiple cells 910 each include, or be allocated use of, at least one or more server computers 1002.

Figure 11:
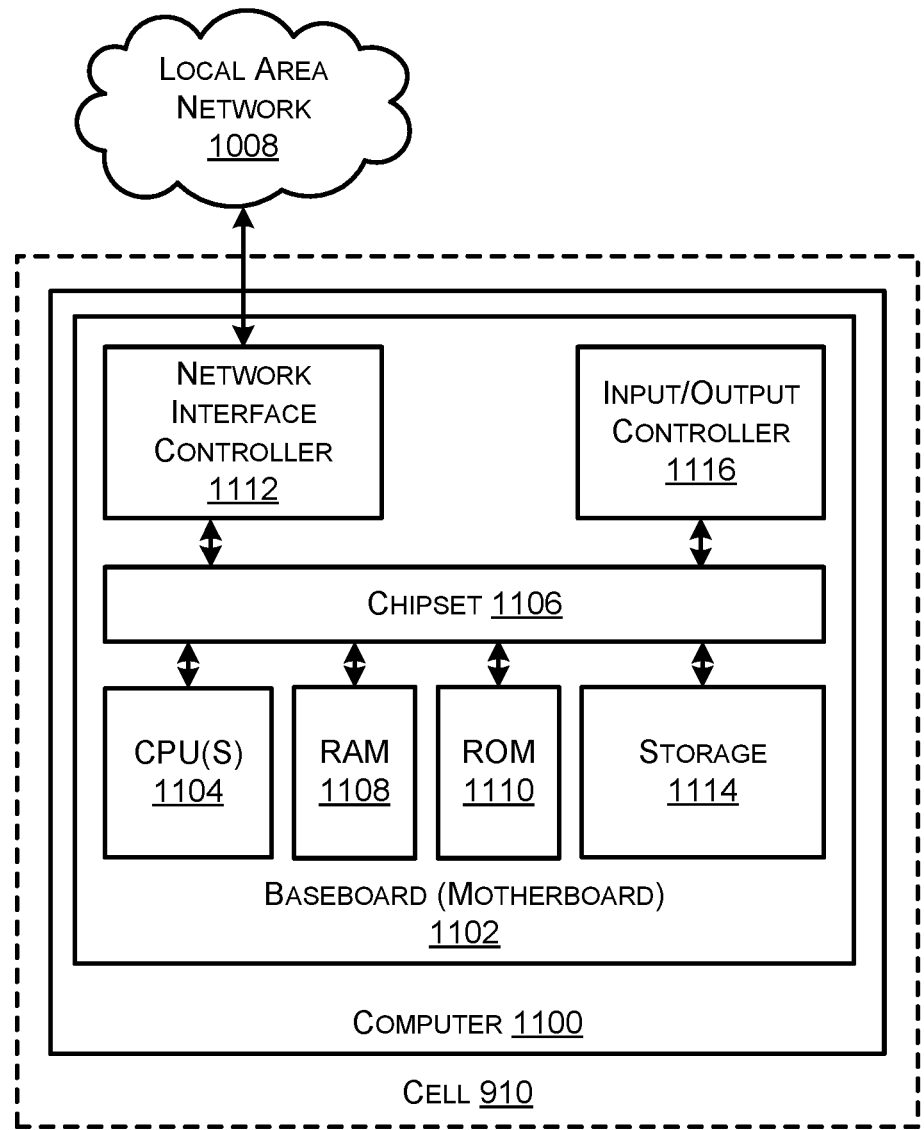
FIG. 11 is a computer architecture diagram showing an illustrative computer hardware architecture for implementing a computing device that can be utilized to implement aspects of the various technologies presented herein.

FIG. 11 shows an example computer architecture for a computer 1100 capable of executing program components for implementing the functionality described above. The computer architecture shown in FIG. 11 illustrates a server computer 1100 that may correspond to, or be the same as or similar to, a server included in a cell 116 described herein.

In some instances, the server computer 1100 may support or be included in the cell-manager system 104.

The computer 1100 includes a baseboard 1102, or "motherboard," which is a printed circuit board to which a multitude of components or devices can be connected by way of a system bus or other electrical communication paths. In one illustrative configuration, one or more central processing units ("CPUs") 1104 operate in conjunction with a chipset 1106. The CPUs 1104 can be standard programmable processors that perform arithmetic and logical operations necessary for the operation of the computer 1100.

The CPUs 1104 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1106 provides an interface between the CPUs 1104 and the remainder of the components and devices on the baseboard 1102. The chipset 1106 can provide an interface to a RAM 1108, used as the main memory in the computer 1100. The chipset 1106 can further provide an interface to a computer-readable storage medium such as a read-only memory ("ROM") 1110 or non-volatile RAM ("NVRAM") for storing basic routines that help to startup the computer 1100 and to transfer information between the various components and devices. The ROM 1110 or NVRAM can also store other software components necessary for the operation of the computer 1100 in accordance with the configurations described herein.

The computer 1100 can operate in a networked environment using logical connections to remote computing devices and computer systems through a network, such as the network 1008. The chipset 1106 can include functionality for providing network connectivity through a network interface controller (NIC) 1112, such as a gigabit Ethernet adapter. The NIC 1112 is capable of connecting the computer 1100 to other computing devices over the network 1008 (or 130). It should be appreciated that multiple NICs 1112 can be present in the computer 1100, connecting the computer to other types of networks and remote computer systems.

The computer 1100 can include storage 1114 (e.g., disk) that provides non-volatile storage for the computer. The storage 1114 can consist of one or more physical storage units. The storage 1114 can store information by altering the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1100 can further read information from the storage 1114 by detecting the physical states or characteristics of one or more particular locations within the physical storage units.

In addition to the storage 1114 described above, the computer 1100 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1100. In some examples, the operations performed by the service provider network 102, and or any components included therein, may be supported by one or more devices similar to computer 1100. Stated otherwise, some or all of the operations performed by the service provider network 102, and or any components included therein, may be performed by one or more computer devices 1100 operating in a network-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The storage 1114 can store an operating system utilized to control the operation of the computer 1100. According to one embodiment, the operating system comprises the LINUX operating system. According to another embodiment, the operating system comprises the WINDOWS SERVER operating system from MICROSOFT Corporation of Redmond, Washington. According to further embodiments, the operating system can comprise the UNIX operating system or one of its variants. It should be appreciated that other operating systems can also be utilized. The storage 1114 can store other system or application programs and data utilized by the computer 1100.

In one embodiment, the storage 1114, RAM 1108, ROM 1110, and/or other computer-readable storage media may be encoded with computer-executable instructions which, when loaded into the computer 1100, transform the computer from a general-purpose computing system into a special-purpose computer capable of implementing the embodiments described herein. These computer-executable instructions transform the computer 1100 by specifying how the CPUs 1104 transition between states, as described above. According to one embodiment, the computer 1100 has access to computer-readable storage media storing computer-executable instructions which, when executed by the computer 1100, perform the various techniques described above. The computer 1100 can also include computer-readable storage media having instructions stored thereupon for performing any of the other computer-implemented operations described herein.

Generally, the computer 1100 may be an example of a server (and other computing devices) described herein. The CPU(s) 1104, RAM 1108, ROM 1110, storage 1114, bandwidth of the NIC 1112, and/or other resources of the computer 1100 may be allocated to one or more different VM instances as described herein based on different VM instance types.

The computer 1100 can also include one or more virtualized input/output controllers 1116 for receiving and processing input from a number of input devices, such as a virtualized keyboard, a mouse, a touchpad, a touch screen, an electronic stylus, or other type of input device.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
   a plurality of data centers located in geographic regions of a service provider network, the plurality of data centers comprising computing resources that are grouped into availability zones with isolated failure domains;
   one or more processors; and
   one or more computer-readable media storing computer-executable instructions that, when executed by the one or more processors, cause the one or more processors to perform operations comprising:
      instantiating first and second cells of a service stack in an availability zone, wherein the service stack is configured to manage at least a launch of a type of resource in the availability zone, and wherein the first and second cells of the service stack are logically isolated from one another;
      receiving a request to launch a virtual computing resource of the type of resource in the availability zone on behalf of a user account associated with the service provider network;
      determining that the user account has other virtual computing resources running in the first cell and the second cell;
      receiving first mutation data indicating a first rate at which modifications are made to first virtual computing resources in the first cell;
      receiving second mutation data indicating a second rate at which modifications are made to second virtual computing resources in the second cell;
      determining, using the first mutation data, a first heat value indicating utilization of the first virtual computing resources of the first cell;
      determining, using the second mutation data, a second heat value indicating utilization of the second virtual computing resources of the second cell; and
      launching the virtual computing resource in the first cell based on the first heat value and the second heat value.

2. The system of claim 1, the operations further comprising:
   determining that the first cell has experienced a failure;
   determining a group of cells in which the user account has virtual computing resources running;
   selecting a third cell from amongst the group of cells; and
   moving the virtual computing resource to the third cell.

3. The system of claim 1, the operations further comprising:
   partitioning third computing resources, included in the availability zone, into a third cell for use by third virtual computing resources;
   receiving input indicating that virtual computing resources associated with the user account are restricted from running in more than a threshold number of cells;
   determining that the virtual computing resources associated with the user account are running in the threshold number of cells; and
   refraining from selecting the third cell to launch the virtual computing resource based at least in part on the virtual computing resources associated with the user account running in the threshold number of cells.

4. A computer-implemented method comprising:
   determining to run a virtual computing resource in an availability zone of a service provider network, the availability zone including a first cell and a second cell of a service stack, the first cell allocated first computing resources that are logically isolated from second computing resources allocated to the second cell;
   determining a first value that represents at least a first amount of modifications made to first virtual computing resources running in the first cell;
   determining a second value that represents at least a second amount of modifications made to second virtual computing resources running in the second cell;
   determining to run the virtual computing resource in the first cell based at least in part on the first value and the second value; and
   launching the virtual computing resource on the first computing resources allocated to the first cell.

5. The computer-implemented method of claim 4, further comprising:
   receiving a request to run the virtual computing resource in the availability zone on behalf of a user account; and
   identifying the first virtual computing resources and the second virtual computing resources as being run on behalf of the user account such that the first value and the second value are per-account values for the user account.

6. The computer-implemented method of claim 4, wherein the virtual computing resource is run on behalf of a user account associated with the service provider network, further comprising:
   determining that the first cell has experienced a failure or been removed from the availability zone;
   determining a group of cells in which the user account has virtual computing resources running;
   selecting a third cell from amongst the group of cells; and
   moving the virtual computing resource to the third cell.

7. The computer-implemented method of claim 4, wherein the virtual computing resource is run on behalf of a user account associated with the service provider network, further comprising:
   determining that a third cell has been created in the availability zone;
   determining a threshold number of cells in which the user account is permitted to run the virtual computing resources;
   determining that the user account is running virtual computing resources in less than the threshold number of cells; and
   launching another virtual computing resource on behalf of the user account on third computing resources of the third cell based at least in part on the user account running virtual computing resources in less than the threshold number of cells.

8. The computer-implemented method of claim 4, wherein the virtual computing resource is run on behalf of a user account associated with the service provider network, further comprising:
  determining that the user account is restricted from running virtual computing resources in more than a threshold number of cells;
  determining that the virtual computing resources associated with the user account are running in at least the threshold number of cells; and
  refraining from selecting a third cell to launch the virtual computing resource based at least in part on the virtual computing resources associated with the user account running in the threshold number of cells.

9. The computer-implemented method of claim 4, further comprising:
  determining that the first value has exceeded a threshold value indicating a maximum amount of modifications permitted for the first cell; and
  migrating the virtual computing resource from the first cell to run on the second computing resources of the second cell.

10. The computer-implemented method of claim 4, wherein the virtual computing resource is run on behalf of a user account associated with the service provider network, further comprising:
  determining that a group of virtual computing resources are running on behalf of the user account in a group of cells of the availability zone; and
  selecting, from the group of cells, the first cell in which to run the virtual computing resource, wherein the group of cells includes at least the first cell at the second cell.

11. The computer-implemented method of claim 4, further comprising:
  receiving mutation data indicating a rate at which the first amount of modifications are made to the first virtual computing resources in the first cell;
  receiving utilization data indicating at least one of:
    an amount of network traffic associated with the first cell; or
    an amount of a resource type utilized by the first virtual computing resources, the resource type being at least one of a central processing unit (CPU) resource type, a memory resource type, or a storage resource type; and
  calculating the first value based at least in part on the mutation data and the utilization data.

12. The computer-implemented method of claim 4, wherein the virtual computing resource is run on behalf of a user account associated with the service provider network, further comprising:
  determining that other virtual computing resources have previously run, or are currently running, in the first cell and the second cell on behalf of the user account; and
  selecting the first cell from amongst at least the first cell and the second cell based at least in part on the other virtual computing resources previously run, or currently running, in the first cell and the second cell.

13. A system comprising:
  one or more processors; and
  one or more computer-readable media storing computer-executable instructions that, when executed by one or more processors, cause the one or more processors to perform operations comprising:
    determining to run a virtual computing resource on behalf of a user account in an availability zone of a service provider network;
    determining that the user account currently has, or previously had, a plurality of virtual computing resources running in a group of cells of the availability zone, the group of cells including a first cell and a second cell of a service stack, the first cell allocated first computing resources that are logically isolated from second computing resources allocated to the second cell;
    selecting, using a distribution algorithm and from the group of cells, the first cell for running the virtual computing resources; and
    launching the virtual computing resource on the first computing resources allocated to the first cell.

14. The system of claim 13, the operations further comprising:
  receiving first mutation data indicating a first amount of modifications made to first virtual computing resources in the first cell;
  receiving second mutation data indicating a second amount of modifications made to second virtual computing resources in the second cell;
  determining, using the first mutation data, a first value indicating utilization of the first computing resources of the first cell; and
  determining, using the second mutation data, a second value indicating utilization of the second computing resources of the second cell,
  wherein the first cell is selected based at least in part on the first value and the second value.

15. The system of claim 13, the operations further comprising:
  determining that the first cell has experienced a failure or been removed from the availability zone;
  selecting a third cell from amongst the group of cells; and
  moving the virtual computing resource to the third cell.

16. The system of claim 13, the operations further comprising:
  determining that a third cell has been created in the availability zone;
  determining a threshold number of cells in which the user account is permitted to run the virtual computing resources;
  determining that a number of cells in the group of cells is less than the threshold number of cells; and
  launching another virtual computing resource on behalf of the user account on third computing resources of the third cell based at least in part on the number of cells in the group of cells being less than the threshold number of cells.

17. The system of claim 13, the operations further comprising:
  determining that the user account is restricted from running the virtual computing resources in more than a threshold number of cells;
  determining that a number of cells in the group of cells is at least the threshold number of cells; and
  refraining from selecting a third cell to launch the virtual computing resource based at least in part on the number of cells in the group of cells being at least the threshold number of cells.

18. The system of claim 13, the operations further comprising:
  determining a value that represents at least an amount of modifications made to a portion of the virtual computing resources that are running in the first cell;

determining that the value has exceeded a threshold value indicating a maximum amount of modifications permitted for the first cell; and migrating the virtual computing resource from the first cell to run on the second computing resources of the second cell.

19. The system of claim 18, the operations further comprising:

receiving mutation data indicating a rate at which modifications are made to first virtual computing resources in the first cell;

receiving utilization data indicating at least one of:

an amount of network traffic associated with the first cell; or an amount of a resource type utilized by the first virtual computing resources, the resource type being at least one of a central processing unit (CPU) resource type, a memory resource type, or a storage resource type; and calculating the value based at least in part on the mutation data and the utilization data, wherein the first cell is selected based at least in part on the value.

20. The system of claim 13, the operations further comprising:

determining a first value that represents at least a first amount of modifications made to first virtual computing resources running in the first cell; and determining a second value that represents at least a second amount of modifications made to second virtual computing resources running in the second cell, wherein the first cell is selected based at least in part on the first value and the second value.

* * * * *